(12) United States Patent
Liu

(10) Patent No.: US 12,485,566 B2
(45) Date of Patent: Dec. 2, 2025

(54) WORKPIECE GUIDING DEVICE

(71) Applicant: SUPER POWER TOOLS CO., LTD., Taichung (TW)

(72) Inventor: Yu-Chun Liu, Taichung (TW)

( * ) Notice: Subject to any disclaimer, the term of this patent is extended or adjusted under 35 U.S.C. 154(b) by 324 days.

(21) Appl. No.: 18/299,494

(22) Filed: Apr. 12, 2023

(65) Prior Publication Data

US 2024/0342944 A1 Oct. 17, 2024

(51) Int. Cl.
*B25B 11/00* (2006.01)
*B25B 1/02* (2006.01)
*B27B 25/10* (2006.01)

(52) U.S. Cl.
CPC ............... *B27B 25/10* (2013.01); *B25B 1/02* (2013.01)

(58) Field of Classification Search
CPC .... B25B 1/00; B25B 1/02; B25B 1/10; B25B 1/2452; B25B 1/06; B25B 1/2457; B25B 5/00; B27B 25/10; B23Q 3/00; B23Q 3/066

See application file for complete search history.

(56) References Cited

U.S. PATENT DOCUMENTS

| | | | | |
|---|---|---|---|---|
| 3,218,059 A * | 11/1965 | Andrew | ................. | B23Q 3/104 269/271 |
| 4,650,379 A * | 3/1987 | Jaskolski | .................. | B25B 5/10 269/902 |
| 6,113,088 A * | 9/2000 | Gakhar | .................... | B25B 5/105 269/220 |
| 6,126,158 A * | 10/2000 | Engibarov | ................ | B25B 5/08 269/157 |
| 9,498,868 B2 * | 11/2016 | Quaiz | ..................... | B25B 5/163 |
| 12,220,739 B2 * | 2/2025 | Stuart | .................. | B21D 5/0281 |
| 2024/0342944 A1 * | 10/2024 | Liu | ............................ | B25B 1/02 |

* cited by examiner

*Primary Examiner* — Lee D Wilson
(74) *Attorney, Agent, or Firm* — Egbert, McDaniel & Swartz, PLLC

(57) ABSTRACT

A workpiece guiding device having a base, a supporting component and a limiting component, wherein the base is formed with a loading surface to load the workpiece. The loading surface is formed with a first long slot facing downward. A supporting component is movably configured on the loading surface. The bottom of the supporting component is formed with a second long slot facing upward. The first and second long slots are opposite each other in the vertical direction, forming a long first space. The limiting component is removably configured in the first space. The radial periphery of the limiting component enters the long slots. One side of the supporting component is defined as a supporting side, which is used to receive the lateral pressing by the workpiece. The workpiece guiding device enhances the convenience in adjusting the position of the supporting component at a regularly used tooling angle.

12 Claims, 9 Drawing Sheets

WORKPIECE GUIDING DEVICE

CROSS-REFERENCE TO RELATED U.S. APPLICATIONS

Not applicable.

BACKGROUND OF THE INVENTION

1. Field of the Invention

The present invention relates generally to a carpenter tool, and more particularly to a workpiece guiding device that enables quick adjustment of the selected tooling angle of the wooden workpiece in relation to the machining tool.

2. Description of Related Art Including Information Disclosed Under 37 CFR 1.97 And 37 CFR 1.98

Circular sawing machines, band sawing machines, and wood milling machines are machines for cutting workpieces made of wood. A machine has a workbench. The workpiece is placed on the workbench. The workpiece is moved toward the working machining tool. The plurality of cutting blades of the machining tool cut the workpiece. The machining tool can be a circular saw, a band saw, or a milling cutter.

When the tooling machine carries out identical cutting operations for multiple workpieces of the same specification in a sequence, the workpieces must be placed on the workbench one after another, and individually align each workpiece to the machining tool. A fixture that guides the moving direction of the workpiece can enhance the working efficiency and tooling accuracy when executing repeated cutting operations.

The fixture is configured on the workbench. The fixture can move on the top of the workbench and be positioned. One side of the fixture is formed with an abutting surface. The fixture can be adjusted according to the tooling requirement, so that a specific relative angle and distance between the abutting surface and the machining tool can be formed. During the tooling operation, the workpiece placed on the workbench is pressed laterally against the abutting surface, and the workpiece is pushed toward the machining tool. The abutting surface guides the workpiece to move along a specific angle toward the machining tool.

When a fixture is configured on the workbench, an assisting fixture to fix the workpiece can be used. The assisting fixture is configure on the workbench and is laterally pressed against the abutting surface of the fixture. The assisting fixture is operated to move along the abutting surface. Thus, the fingers of the user do not need to touch and press the workpiece, and can be kept away from the machining tool. This can enhance safety when cutting the workpiece.

The assisting fixture to guide the movement direction of the workpiece comprises a bed plate, a long guiding component, two clamping structures and two pressing structures, wherein the bed plate is configured on top of the workbench, and is pressed laterally against the abutting surface of the fixture. The bed plate can slide back and forth along the abutting surface. The bed plate is used to load the workpiece. The guiding component is configured on top of the bed plate, and the guiding component can move on top of the bed plate. The clamping structures are used to clamp the bed plate and the guiding component, so as to position the guiding component. One side of the guiding component is formed with a vertical guiding surface. The guiding surface and the machining tool are parallel to each other or have a specific included angle. The pressing structure is configured on the guiding component. The pressing structure is used to press the workpiece placed on the bed plate from above, avoiding displacement of the workpiece during the tooling process under the force of the machining tool.

The workpiece is placed on top of the bed plate and is laterally pressed against the guiding surface. Based on the relative angle and distance between the guiding surface and the machining tool, the machining tool can cut the workpiece along a predetermined tooling path.

When both a fixture and an assisting fixture are used, the fixture or the guiding component of the assisting fixture can be adjusted as needed to change the tooling path of the machining tool.

To adjust the fixture or the guiding component, measuring tools or modules such as a scale or a gauge is required to measure the angle of the abutting surface or the guiding surface in relation to the machining tool. When the required tooling angle is met, usually a test tooling process is executed to confirm if the tooling angle satisfies the tooling requirement and to determine the accuracy during actual tooling. Based on the result of test tooling, the operator may conduct another adjustment or directly proceed to the tooling operation.

In most cases, the machining tool cuts the workpiece in a path parallel to the abutting surface. The angle between the machining tool and the workpiece is hereinafter called a tooling angle. A machining tool such as a circular saw or band saw can be used to cut the workpiece to form a vertical benchmark surface. There are less cases when the tooling path of the machining tool is required to be not parallel to the abutting surface. When it is required to change a regularly used tooling angle to other tooling angles, the abutting surface must undergo the above adjusting operations and another test tooling operation is required. When the fixture is needed to change from another tooling angle back to the regularly used tooling angle, the above adjusting operation and test tooling operation are also required. There are particularly frequent cases that require change of the tooling angle back to the regular angle. The aforesaid other tooling angles refer to a tooling angle other than the regularly used tooling angle, and is not limited to a specific angle.

BRIEF SUMMARY OF THE INVENTION

The main object of the invention is to provide a workpiece guiding device.

The technical feature of the invention to solve the aforesaid problems lies in that the workpiece guiding device comprises:

a base, wherein said base is formed with a loading surface on its top, the loading surface is used to carry the workpiece, the loading surface is formed with a first long slot facing downward, one side of the base is defined as the first opposite side, the first opposite side is adjacent to the loading surface, a virtual plane perpendicular to the loading surface is defined, and the plane intersects with the first opposite side;

a supporting component, movably configured on the loading surface, wherein the bottom of the supporting component is formed with a second long slot facing upward, one side of the supporting component is defined as the supporting side, the other side of the supporting component is defined as the second opposite side, the supporting side and the second opposite side 34 are respectively adjacent to the bottom of the supporting component, the supporting side intersects with the plane, an included angle θ is formed between the supporting side and the plane, the supporting side is used to receive lateral pressing by the workpiece, the second long slot extends to the second opposite side, the first long slot and the second long slot are opposite each other in the vertical direction, so that the base and the supporting component enclose a long first space;

a long column-shaped limiting component, removably configured in the first space, the radial periphery of the limiting component enters the first long slot and the second long slot; and two clamping structures, respectively clamping the base and the supporting component.

According to the tooling requirement, the present invention can easily adjust the included angle to a specific angle without using angle measuring tools or modules such as protractors or angle gauges, and thus can enhance the convenience in adjusting the position of the supporting component at a regularly used tooling angle.

DETAILED DESCRIPTION OF THE INVENTION

Figure 1:
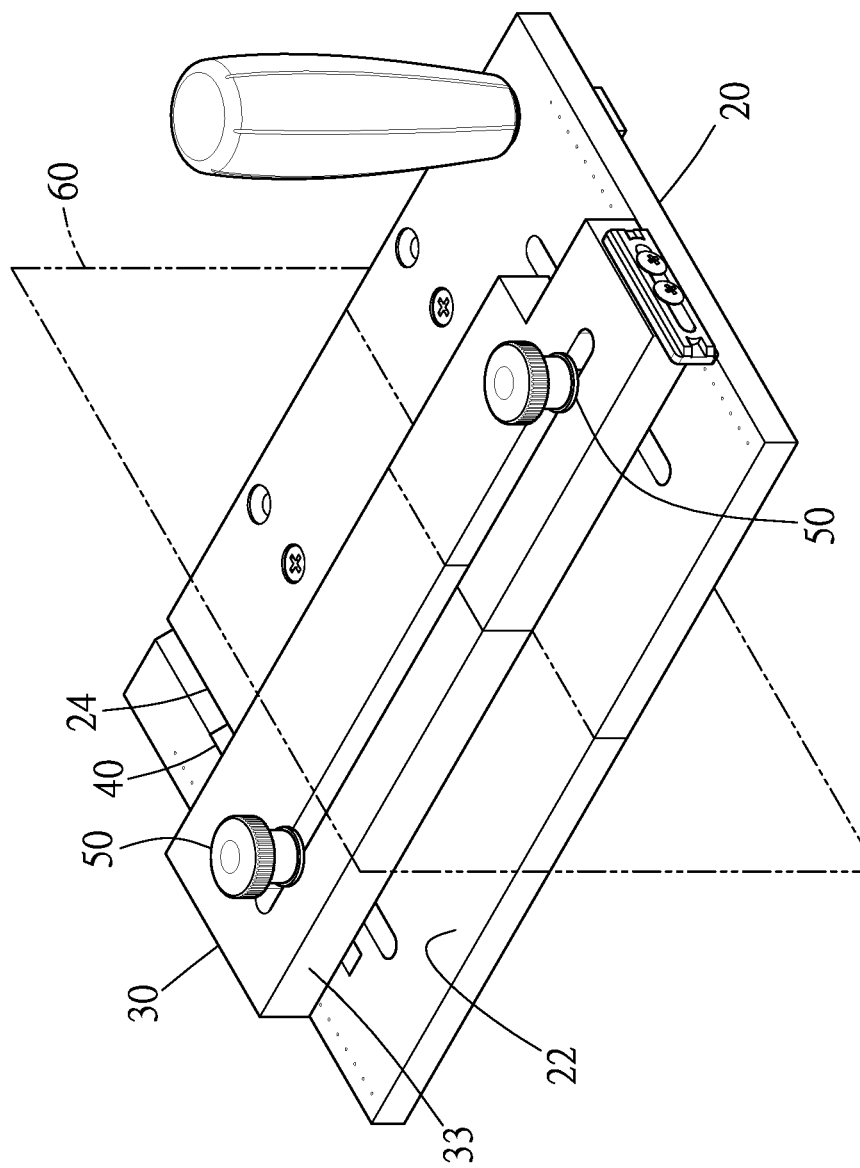
FIG. 1 is a perspective view of Embodiment 1 of the invention.
Figure 2:
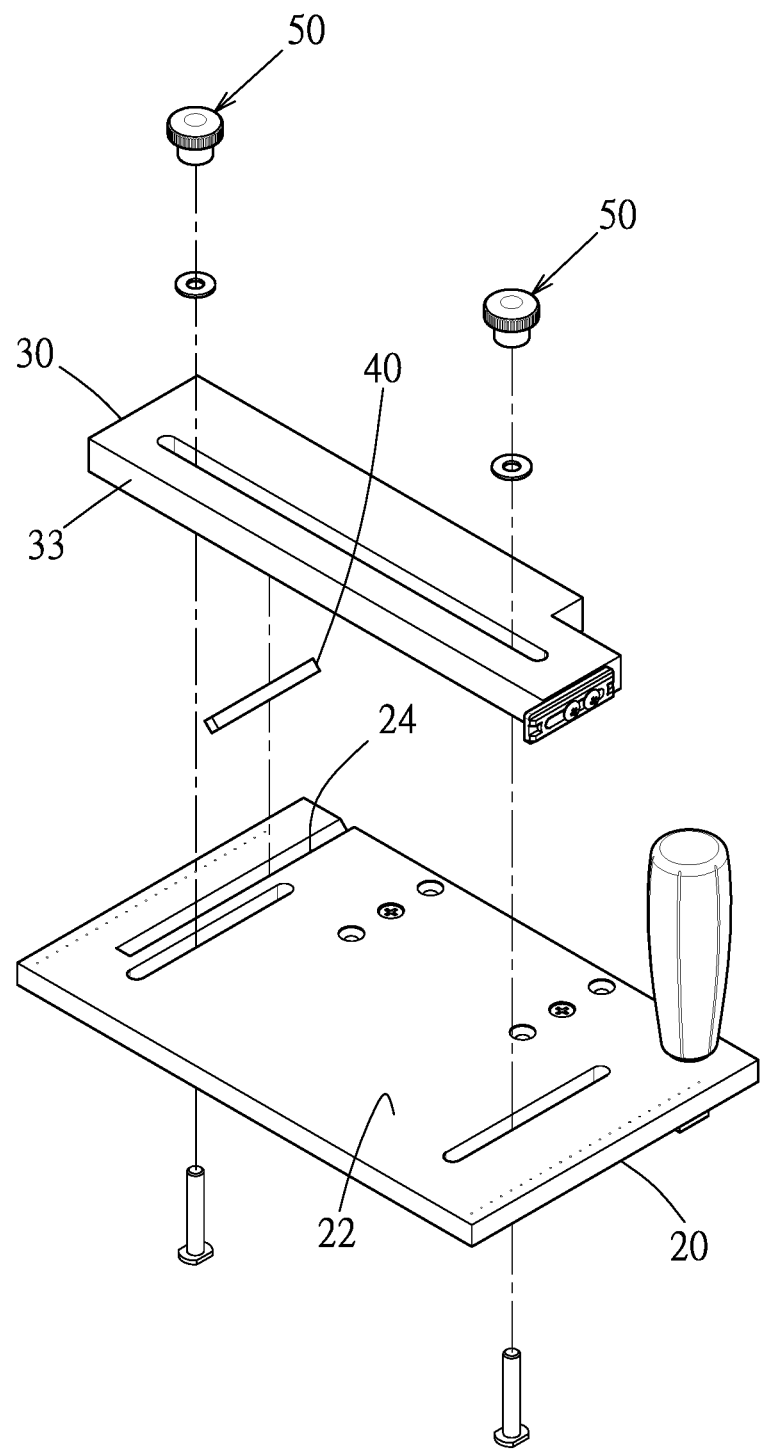
FIG. 2 is an exploded perspective view of Embodiment 1 of the invention.
Figure 3:
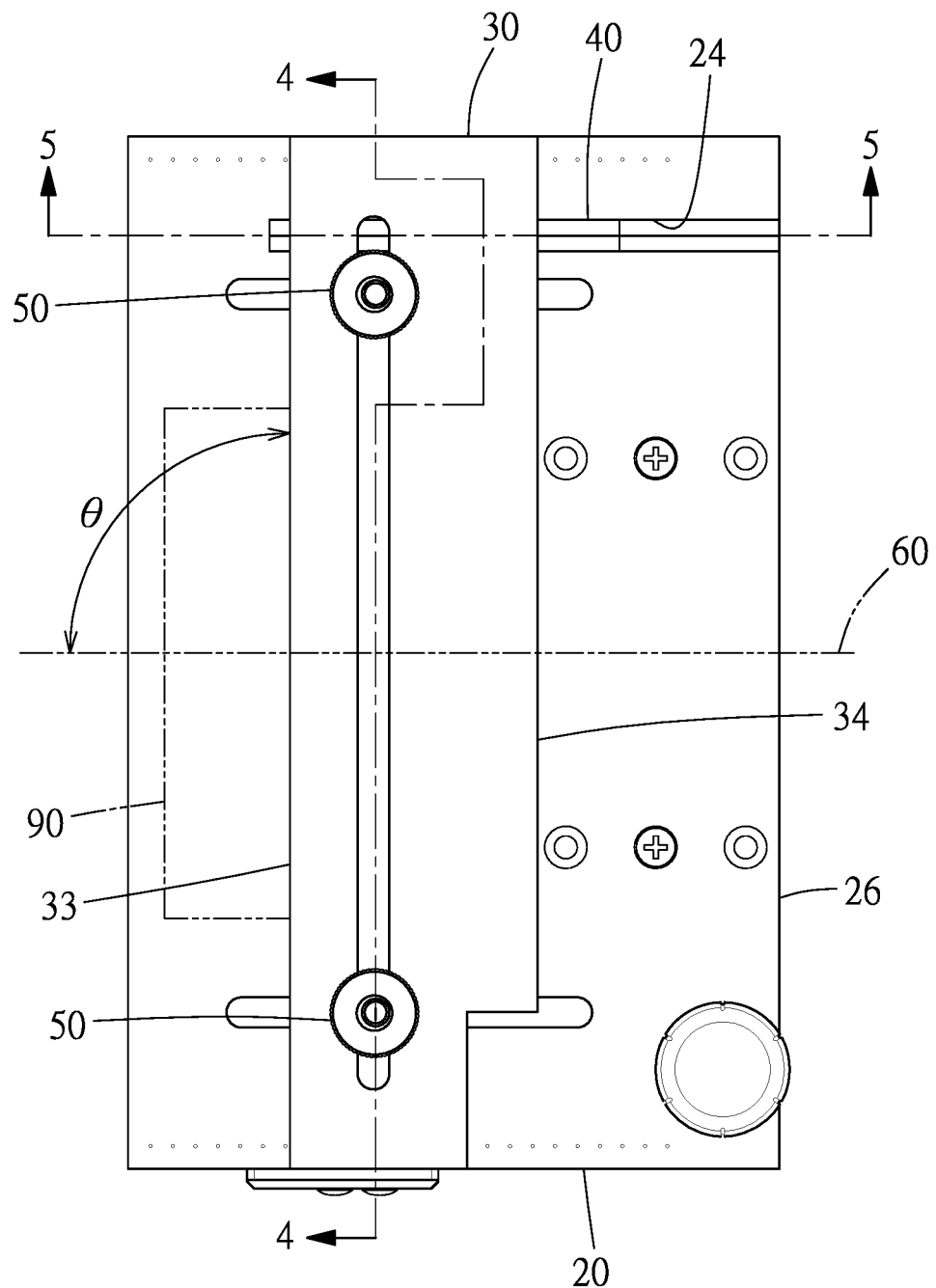
FIG. 3 is a top view of Embodiment 1 of the invention.

As shown in FIGS. 1 to 5, Embodiment 1 of the workpiece guiding device according to the invention comprises a base 20, a supporting component 30, a long column-shaped limiting component 40, and two clamping structures 50. The top of the base 20 is formed with a loading surface 22. The loading surface 22 is used to load a workpiece 90, and the loading surface 22 is formed with a first long slot 24 facing downward. One side of the base 20 is defined as the first opposite side 26. The first opposite side 26 is adjacent to the loading surface 22. A virtual plane 60 is defined to be perpendicular to the loading surface 22, and the plane 60 intersects with the first opposite side 26.

The supporting component 30 is movably configured on the loading surface 22. The bottom of the supporting component 30 is formed with a second long slot 32. Specifically, the bottom of the supporting component 30 is formed with a bottom surface 31, and the bottom surface 31 is formed with a second long slot 32 facing upward. In the present embodiment, the bottom surface 31 is optionally abutted against the loading surface 22. Alternatively, the bottom surface 31 can also be not abutted against the loading surface 22. One side of the supporting component 30 is defined as the supporting side 33. The other side of the supporting component 30 is defined as the second opposite side 34. The supporting side 33 and the second opposite side 34 are respectively adjacent to the bottom surface 31. The supporting side 33 and the plane 60 intersect with each other. An included angle θ is formed between the supporting side 33 and the plane 60. The supporting side 33 is used to receive lateral abutting by the workpiece 90. The second long slot 32 extends to the second opposite side 34. The first long slot 24 and the second long slot 32 are opposite each other in the vertical direction, so that the base 20 and the supporting component 30 enclose a long first space 72. The radial section of the first space 72 is a quadrilateral.

The limiting component 40 is removably configured in the first space 72. The radial periphery of the limiting component 40 enters the first long slot 24 and the second long slot 32, so as to limit the included angle θ to avoid any change. The radial cross section of the limiting component 40 is square, matching the first space 72.

The clamping structures 50 respectively clamp the base 20 and the supporting component 30, so as to position the supporting component 30 to avoid any movement. The clamping structure 50 is prior art commonly known by those skilled in the art. Therefore, details of the clamping structures 50 are not described herein.

Figure 4:
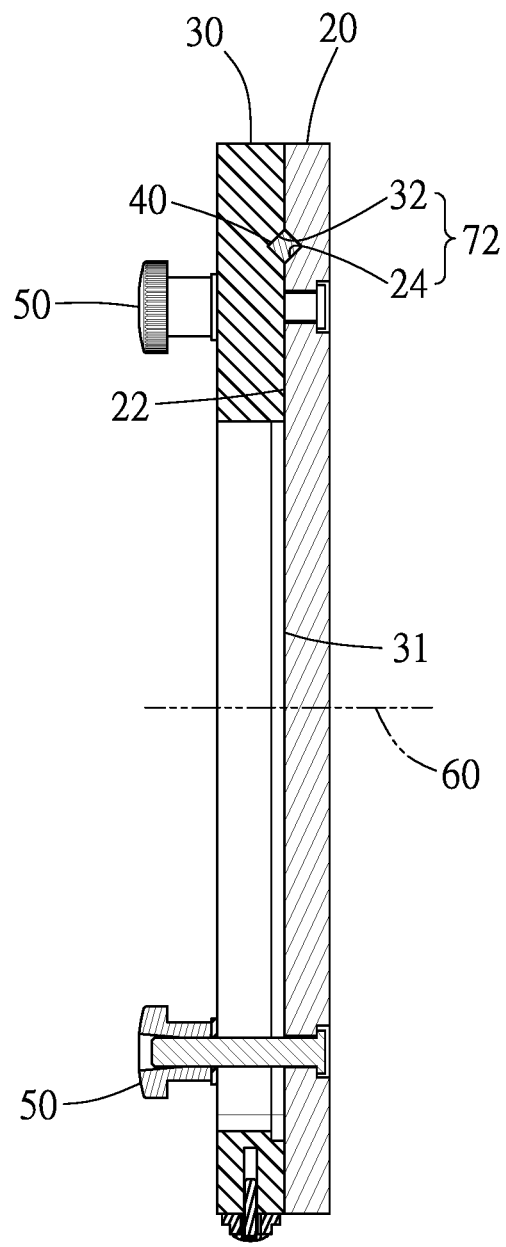
FIG. 4 is 4-4 sectional view of FIG. 3.
Figure 5:
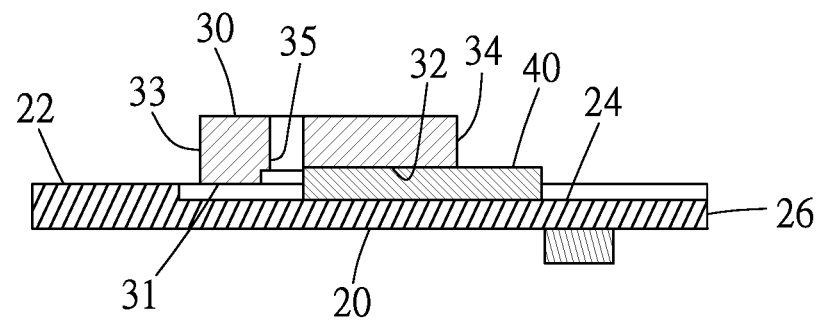
FIG. 5 is 5-5 sectional view of FIG. 3.

The base 20 can be used as the workbench or the bed plate disclosed in prior art. According to the tooling requirement, the limiting component 40 can be provided or removed. As shown in FIG. 4, when the limiting component 40 is provided, the limiting component 40 limits the relative positions of the base 20 and the supporting component 30 in the space, so that the included angle θ will not have any change. When the first space 72 is configured with the limiting component 40, the included angle θ is 90 degrees. The machining tool (not shown in the figure) can cut the workpiece 90 along a path parallel to the supporting side 33. The parallel path forms a regularly used tooling angle.

When the limiting component 40 is removed, the supporting component 30 can be rotated to change the included angle θ according to the tooling requirement, to form other not commonly used tooling angles. The supporting component 30 can also be adjusted to the aforesaid regularly used tooling angle. When the limiting component 40 is not provided, the using state with the included angle θ being 90 degrees is not excluded.

The base 20 can be used as the workbench for the tooling machines disclosed in prior art. The supporting component 30 can be used as the fixture configured on the workbench as disclosed in prior art, so as to guide the movement of the workpiece 90, and to enhance working efficiency and tooling accuracy when executing multiple identical cutting operations.

The present invention can adjust the supporting component 30 to change the included angle θ. When changing from a tooling angle that is not frequently used to the regularly used tooling angle, the provision of the limiting component 40 enables easy adjustment of the included angle θ to be 90 degrees without using angle measuring tools or modules such as a protractor or an angle gauge. Based on the requirement for the tooling size, the user just need to adjust the position of the supporting component 30 in the tangential direction of the plane 60. This can help enhance the convenience in adjusting the position of the supporting component 30 at the regularly used tooling angle.

Optionally, the first long slot 24 extends to the first opposite side 26. The limiting component 40 can be configured or removed without the need to remove the supporting component 30 from the base 20.

Optionally, the supporting component 30 is formed with a stopping surface 35. The stopping surface 35 blocks the end of the limiting component 40 neighboring the supporting side 33, preventing the limiting component 40 from protruding out of the supporting side 33, so that the workpiece 90 cannot be pressed laterally against the supporting side 33.

Figure 6:
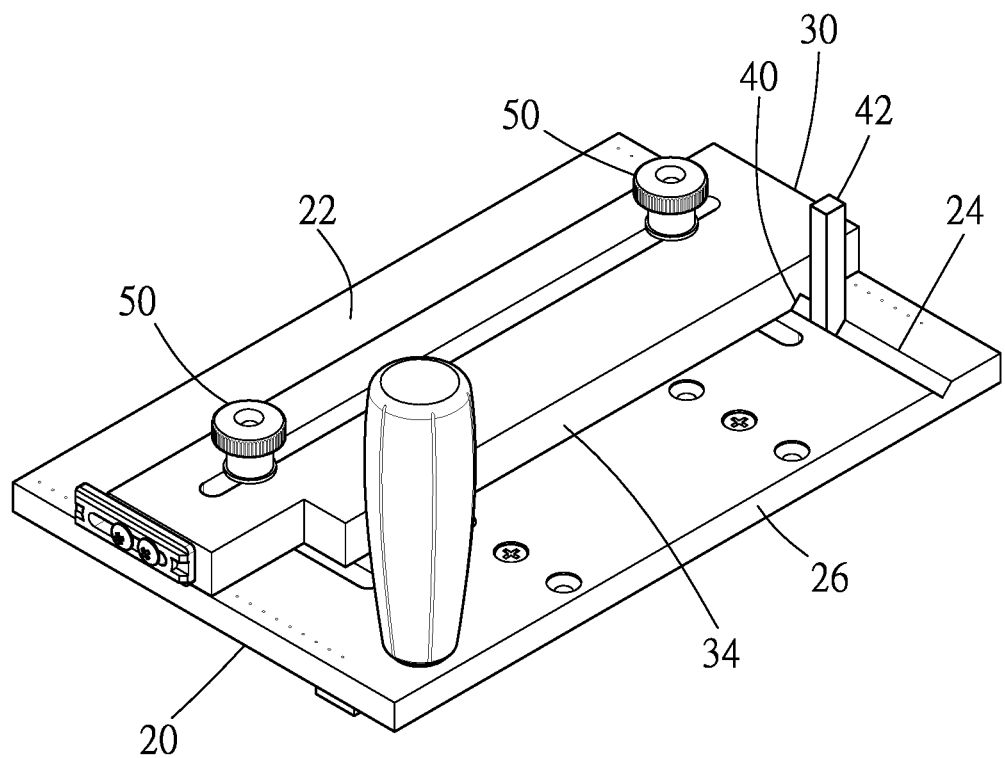
FIG. 6 is a perspective view of Embodiment 2 of the invention.

As shown in FIG. 6, Embodiment 2 differs from Embodiment 1 in that, one end of the limiting component 40 protrudes through the second opposite side 34 to the outside of the supporting component 30 and is connected to an operating shaft 42, and the operating shaft 42 extends upward. As a preferred implementation of the present embodiment, the operating shaft 42 protrudes out of the top of the supporting component 30.

The operating shaft 42 can be controlled by the user to move the limiting component 40 along the direction of the first long slot 24, so as to insert the limiting component 40 into the first space 72 or extract the limiting component 40 from the first space 72, making the operation more convenient.

Figure 7:
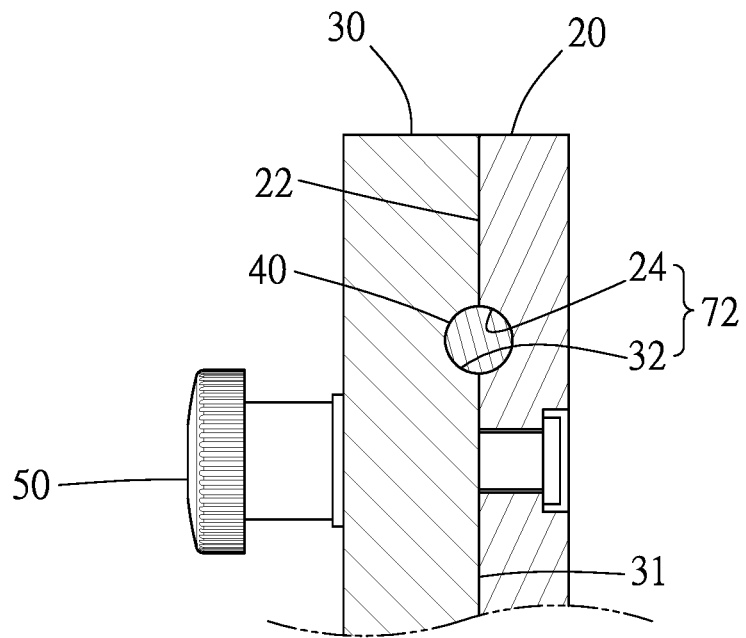
FIG. 7 is a partial sectional view of Embodiment 3 of the invention along the radial directional of the limiting component.

As shown in FIG. 7, Embodiment 3 differs from Embodiment 1 in that, the radial section of the first space 72 is round, and the radial cross section of the limiting component 40 is also round to match the first space 72.

Figure 8:
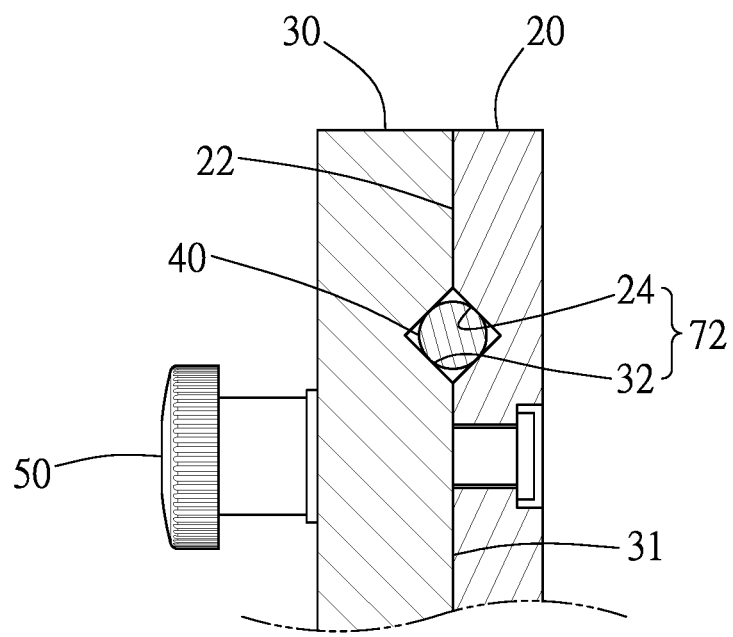
FIG. 8 is a partial sectional view of Embodiment 3 of the invention along the radial directional of the limiting component.

As shown in FIG. 8, Embodiment 4 differs from Embodiment 1 in that, the radial section of the first space 72 is quadrilateral, and the radial cross section of the limiting component 40 is round.

Figure 9:
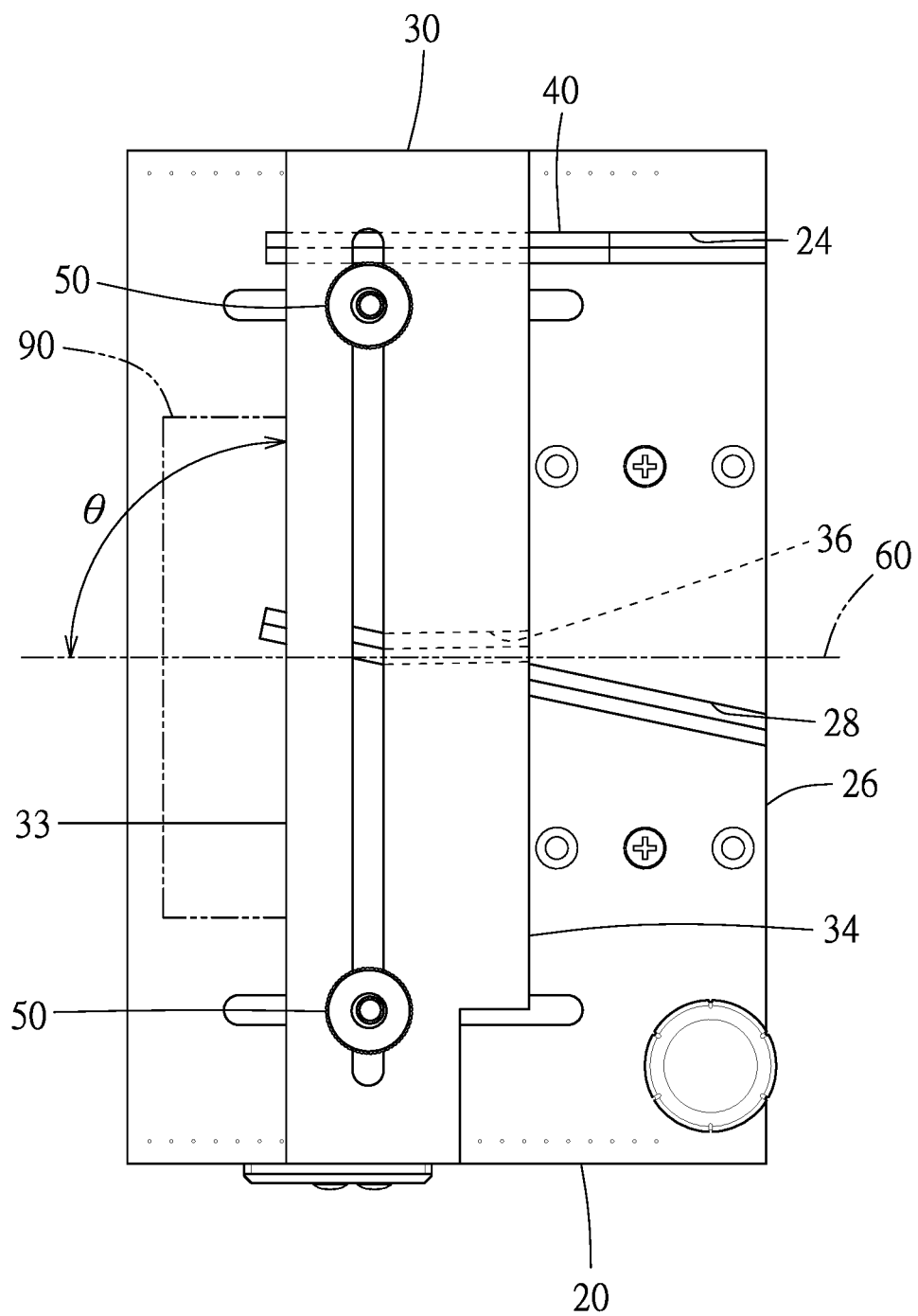
FIG. 9 is a top view of the using state of Embodiment 5 of the invention.
Figure 10:
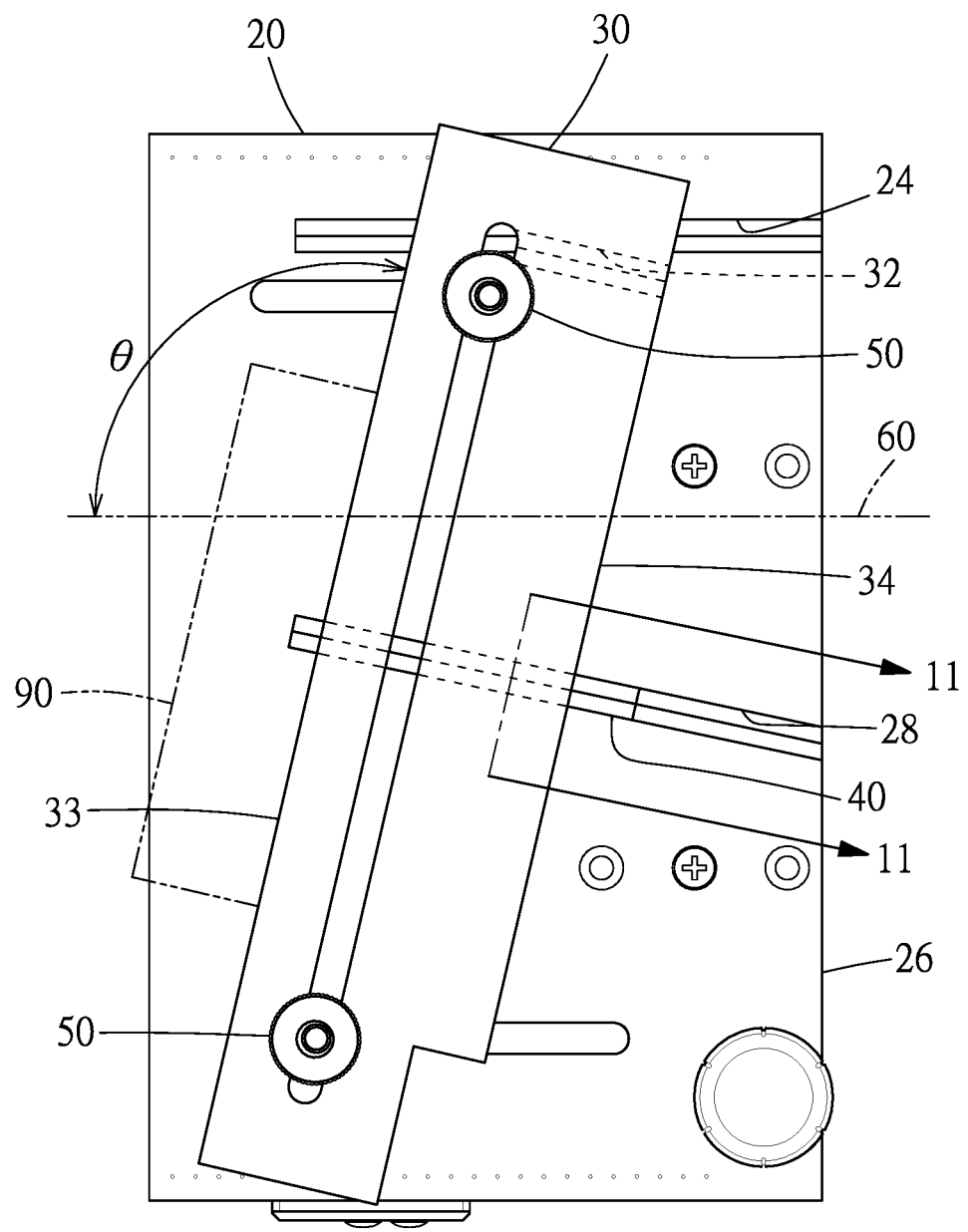
FIG. 10 is a top view of another using state of Embodiment 5 of the invention.
Figure 11:
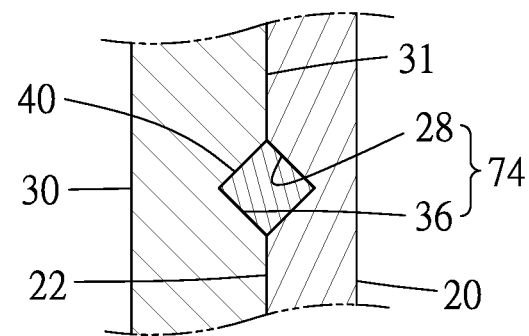
FIG. 11 is 11-11 sectional view of FIG. 10.

As shown in FIGS. 9 to 11, Embodiment 5 differs from Embodiment 1 in that, the loading surface 22 is further formed with a third long slot 28 facing downward. The right projection of the first long slot 24 and the third long slot 28 on the loading surface 22 are not parallel to each other. Optionally, the third long slot 28 extends to the first opposite side 26. The bottom surface 31 is further formed with a fourth long slot 36 facing upward. The fourth long slot 36 extends to the second opposite side 34. By rotating and adjusting the supporting component 30 so that the third long slot 28 and the fourth long slot 36 are opposite each other in the vertical direction, the base 20 and the supporting component 30 enclose a long second space 74. As shown in FIG. 9, the limiting component 40 can be configured inside the first space 72. As shown in FIG. 10, by rotating and adjusting the supporting component 30, the third long slot 28 and the fourth long slot 36 can be adjusted to be opposite each other in the vertical direction to form the second space 74. The limiting component 40 can also be configured inside the second space 74, and the radial periphery of the limiting component 40 enters the third long slot 28 and the fourth long slot 36. In this way, the included angle θ can be changed according to the tooling requirement.

Embodiment 5 can be applied in cases where there are two regularly used tooling angles, and can enhance the convenience in adjusting the position of the supporting component 30 at any of the regularly used tooling angles.

Figure 12:
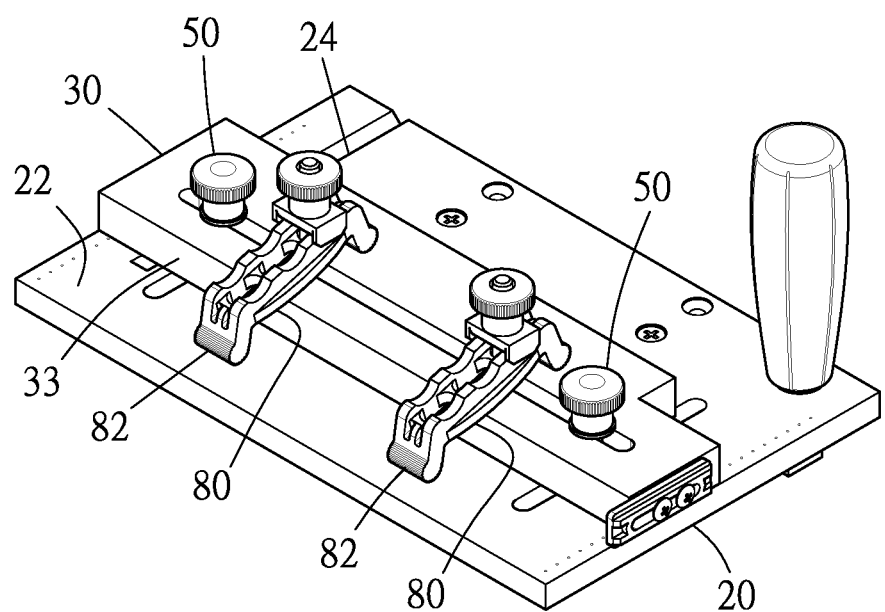
FIG. 12 is a perspective view of Embodiment 6 of the invention.

As shown in FIG. 12, Embodiment 6 differs from Embodiment 1 in that, Embodiment 6 further comprises two pressing structures 80, wherein each of the pressing structures 80 is respectively connected to the supporting component 30, and each of the pressing structures 80 respectively has a pressing part 82. The pressing part 82 is located on top of the loading surface 22 to press the workpiece 90. Embodiment 6 can be used to fix the workpiece 90, so that the user's fingers can be kept away from the machining tool during the tooling operation, thus enhancing safety when cutting the workpiece 90. The pressing structure 80 is prior art commonly known by those skilled in the art, and therefore the structural details of the pressing structure 80 are not described herein in detail.

Embodiment 6 can be used together with any one from Embodiment 1 to Embodiment 5. As an option, Embodiment 6 can be configured on top of the workbench disclosed in prior art to work with the fixture.

I claim:

1. A workpiece guiding device comprising:
   a base having a loading surface on a top thereof, the loading surface adapted to carry a workpiece, the loading surface being formed with a first long slot facing downwardly, said base having a first side that is adjacent to the loading surface, wherein a virtual plane is defined perpendicular to the loading surface, the virtual plane intersecting the first side;
   a supporting component movably positioned on the loading surface of said base, said supporting component having a second long slot formed facing upwardly at a bottom of said supporting component, said supporting component having a supporting side and a side opposite to the supporting side, the supporting side and the side opposite to the supporting side being adjacent to the bottom of said supporting component, the supporting side intersecting the virtual plane so as to define an included angle θ, the supporting side adapted to receive a lateral pressing by the workpiece, the second long slot extending to the side opposite the supporting side, wherein the first long slot and the second long slot are vertically opposite to each other so as to define a first space between said base and said supporting component;
   a column-shaped limiting component removably positioned in the first space, wherein a radial periphery of said column-shaped limiting component enters the first long slot and the second long slot so as to limit a relative position of said base and said supporting component in the first space and to fix the included angle θ; and
   a pair of clamping structures that respectively clamp said base and said supporting component.

2. The workpiece guiding device of claim 1, wherein the first long slot extends to the first side.

3. The workpiece guiding device of claim 1, wherein said supporting component has a stopping surface that blocks an end of said column-shaped limiting component adjacent to the supporting side.

4. The workpiece guiding device of claim 1, wherein the end of said column-shaped limiting component extends through the side opposite the supporting side to an exterior of said supporting component, the end of said column-shaped limiting component being connected to an operating shaft, the operating shaft extending upwardly.

5. The workpiece guiding device of claim 1, wherein the first space is quadrilateral.

6. The workpiece guiding device of claim 4, wherein a radial cross section of said column-shaped limiting component is square.

7. The workpiece guiding device of claim 5, wherein a radial cross section of said column-shaped limiting component is round.

8. The workpiece guiding device of claim 1, wherein a radial cross section of the first space is round.

9. The workpiece guiding device of claim 8, wherein a radial cross section of said column-shaped limiting component is round.

10. The workpiece guiding device of claim 1, the loading surface has a third long slot facing downwardly, the first long slot and the third long slot have respective right projections that are not perpendicular to each other, wherein the bottom of said supporting component has a fourth long slot facing upwardly, the fourth long slot extending to the side opposite the supporting side such that the third long slot and the fourth long slot are vertically opposite to each other so as to define a second space therebetween, wherein said column-shaped limiting component is positioned in the second space, the radial periphery of said column-shaped limiting component entering the third long slot and the fourth long slot so as to change the included angle θ.

11. The workpiece guiding device of claim 10, wherein the third long slot extends to the first side of said base.

12. The workpiece guiding device of claim 1, further comprising:
   a pair of pressing structures respectively connected to said supporting component, each pressing structure of said pair of pressing structures located on a top of the loading surface of said base and adapted to press the workpiece.

\* \* \* \* \*